United States Patent
Morlacchi

(10) Patent No.: US 8,821,671 B2
(45) Date of Patent: Sep. 2, 2014

(54) PROCESS AND SYSTEM FOR WATERPROOFING SEMIMANUFACTURED PRODUCTS OF FOOTWEAR, GLOVES, CLOTHING ITEMS AND ACCESSORIES AS WELL AS SEMIMANUFACTURED PRODUCTS OBTAINED WITH THIS PROCESS OR SYSTEM

(75) Inventor: Matteo Morlacchi, Legnano MI (IT)

(73) Assignee: OutDry Technologies Corporation, Portland, OR (US)

( * ) Notice: Subject to any disclaimer, the term of this patent is extended or adjusted under 35 U.S.C. 154(b) by 1448 days.

(21) Appl. No.: 11/908,086

(22) PCT Filed: Mar. 7, 2006

(86) PCT No.: PCT/IT2006/000135
§ 371 (c)(1),
(2), (4) Date: Sep. 7, 2007

(87) PCT Pub. No.: WO2006/095375
PCT Pub. Date: Sep. 14, 2006

(65) Prior Publication Data
US 2008/0121835 A1   May 29, 2008

(30) Foreign Application Priority Data
Mar. 10, 2005   (IT) .............................. MI2005A0385

(51) Int. Cl.
| | | |
|---|---|---|
| *B32B 37/12* | (2006.01) | |
| *D06M 15/59* | (2006.01) | |
| *B32B 37/14* | (2006.01) | |
| *A41D 19/00* | (2006.01) | |
| *C08F 236/10* | (2006.01) | |
| *A43B 7/12* | (2006.01) | |

(52) U.S. Cl.
CPC .............. *A43B 7/12* (2013.01); *A41D 19/0058* (2013.01); *C08F 236/10* (2013.01)
USPC .......................... 156/245; 252/8.62; 252/8.57

(58) Field of Classification Search
CPC ............ C08F 236/10; C08F 4/48; A43B 7/12
USPC ......................................................... 156/245
See application file for complete search history.

(56) References Cited

U.S. PATENT DOCUMENTS 2,724,676 A    11/1955   Randall et al.
(Continued)

FOREIGN PATENT DOCUMENTS

DE             100 04 355         8/2001
(Continued)

OTHER PUBLICATIONS

Opposition Papers regarding pending parallel European Patent EP 1 860 966.

*Primary Examiner* — Philip Tucker
*Assistant Examiner* — Vicki Wu
(74) *Attorney, Agent, or Firm* — Schwabe, Williamson & Wyatt, P.C.

(57) ABSTRACT

Process for waterproofing a semimanufactured product (3) of footwear, gloves, clothing items and accessories, said semimanufactured product (3) having a three-dimensional conformation with at least one inner surface and one outer surface, characterized in that it comprises the following operative steps:
  arranging on a shaped support (1, 1a, 1b) the semimanufactured product (3) with at least one waterproofing sheath (4) shaped for entirely or partially cover the surfaces to be waterproofed of the semimanufactured product (3), at least one glue layer being applied between these surfaces and the waterproofing sheath (4);
  sealing the semimanufactured product (3) and/or the waterproofing sheath (4) for preventing the transfer of fluids from the outside between the sheath (4) and the shaped support (1, 1a, 1b);
  inserting the shaped support (1, 1a, 1b) provided with the semimanufactured product (3) and with the sheath (4) into an autoclave (7) for joining under pressure the sheath (4) to the semimanufactured product (3).

Figure 1:
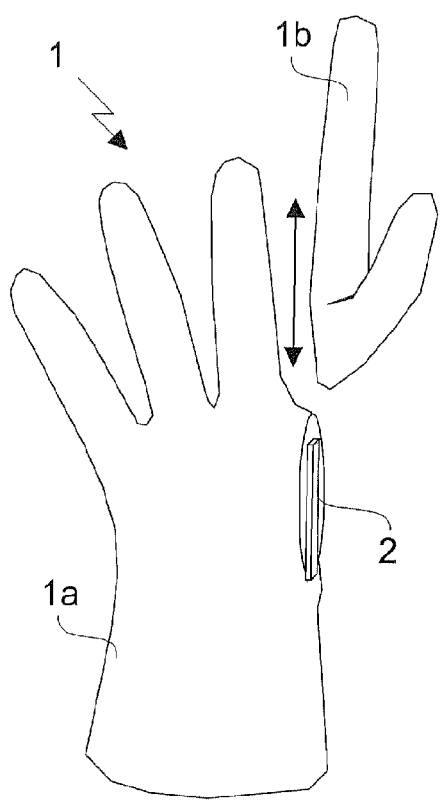

The present invention also relates to a system that carries out said process, as well as the products obtained with said process or system.

16 Claims, 4 Drawing Sheets

(56) References Cited

U.S. PATENT DOCUMENTS

| | | | |
|---|---|---|---|
| 3,632,278 A * | 1/1972 | Hall et al. | 425/451.6 |
| 4,190,685 A * | 2/1980 | Hart et al. | 427/302 |
| 4,877,334 A * | 10/1989 | Cope | 383/3 |
| 4,995,119 A | 2/1991 | Codkind | |
| 5,568,656 A | 10/1996 | Kim | |
| 5,732,413 A * | 3/1998 | Williams | 2/169 |
| 6,539,552 B1 * | 4/2003 | Yoshida | 2/161.6 |
| 7,758,713 B2 * | 7/2010 | Morlacchi | 156/196 |
| 2003/0115679 A1 * | 6/2003 | Morlacchi et al. | 8/115.51 |
| 2004/0020077 A1 * | 2/2004 | Thomas et al. | 36/4 |
| 2006/0123567 A1 * | 6/2006 | Morlacchi | 12/142 R |

FOREIGN PATENT DOCUMENTS

| | | |
|---|---|---|
| FR | 2614768 | 11/1988 |
| FR | 2 738 121 | 3/1997 |
| GB | 2 181 691 | 4/1987 |
| GB | 2 290 455 | 1/1996 |
| WO | WO 89/07523 | 8/1989 |
| WO | WO 95/30793 | 11/1995 |
| WO | WO 99/64078 | 12/1999 |
| WO | WO 00/22948 | 4/2000 |
| WO | WO 01/56415 | 8/2001 |
| WO | WO 02/11571 | 2/2002 |
| WO | WO 2004/060179 | 7/2004 |
| WO | WO 2004/112525 | 12/2004 |
| WO | WO 2004112525 A1 * | 12/2004 |

* cited by examiner

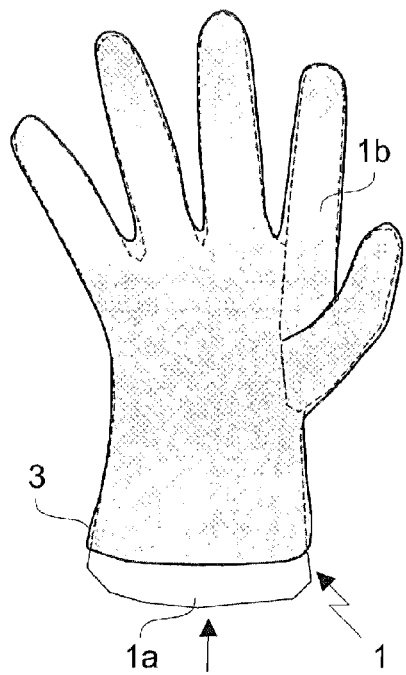
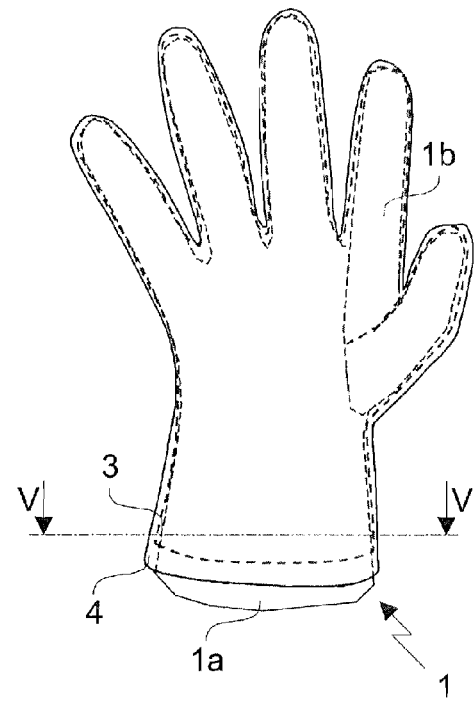
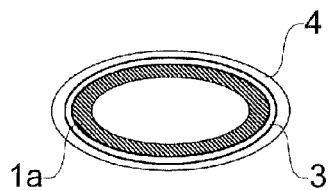

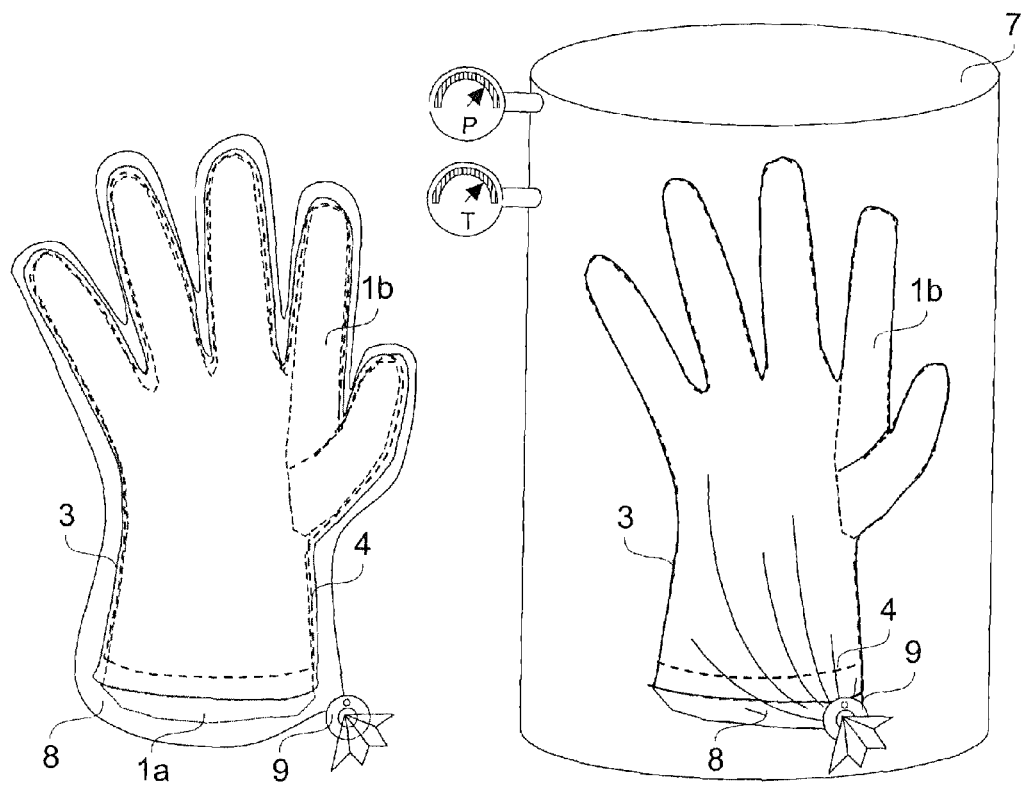

PROCESS AND SYSTEM FOR WATERPROOFING SEMIMANUFACTURED PRODUCTS OF FOOTWEAR, GLOVES, CLOTHING ITEMS AND ACCESSORIES AS WELL AS SEMIMANUFACTURED PRODUCTS OBTAINED WITH THIS PROCESS OR SYSTEM

This patent application claims the benefit of priority from Italian Patent Application No. MI2005A000385 filed Mar. 10, 2005 through PCT Application Serial No. PCT/IT2006/000135 filed Mar. 7, 2006, the contents of each of which are incorporated herein by reference.

The present invention relates to a process for waterproofing semimanufactured products of footwear, gloves, clothing items and accessories, in particular during their manufacture. The present invention also relates to a system that carries out said process, as well as the products obtained with this process or system.

WO 00/22948 discloses a process for waterproofing leather and semimanufactured products made up of pieces of leather sewn to each other. This known process comprises a pressing onto the inner surface of the leather of at least one semipermeable membrane, whose surface contacting the leather is provided with a glue pattern. With this arrangement a suitable transpiration of the leather is achieved also in the zones where it is glued to the membrane.

WO 01/56415 discloses a process for waterproofing gloves, wherein a waterproofing sheath is inserted into a glove and is glued under pressure by means of a pair of shaped devices suitable for heating and inflating the sheath against the inner surfaces of the glove. This known process is relatively long and complex to be carried out.

WO 02/11571 discloses instead a process and a device for waterproofing semimanufactured products made of leather or fabric, also joined with other materials, which cannot be completely spread on a table since they have already taken during the manufacture a three-dimensional conformation with at least one inner surface and one outer surface. A typical example of said manufactured products are the uppers of footwear, considered in their final working step, before the application of an inner lining, if any. Other semimanufactured products of this kind can be boot uppers, gloves, hats and clothes in general in the final step of their manufacture.

WO 2004/112525 discloses a process and a machine which employ particular shaped supports mounted on transport means for transporting, pressing and gluing onto the semimanufactured products, in an automatic manner and by means of two deformable plates, waterproofing sheaths comprising semipermeable membranes.

The latter known machine and the relevant process are suitable for an industrial application on a large scale, where a high degree of automation is necessary for reducing the manufacturing times and costs, however they can involve complications, so as all the above mentioned known processes and devices, when semimanufactured products having a three-dimensional without a symmetry plane, such as for example the gloves with the thumb in an advanced position with respect to the other fingers, must be waterproofed. As a matter of fact, in this case, the deformable plates may have problems for pressing the whole surface of the waterproofing sheath onto the semimanufactured product. In the process according to the above mentioned PCT application WO 01/56415, two distinct pneumatic devices are required for overcoming this technical problem: the first device has the shape of a hand with the thumb only and the second device has the shape of a hand with the remaining four hands.

It is therefore an object of the present invention to provide a process and a device which are free from said disadvantages. Said object is achieved with a process and a system, the main features of which are described in claims 1 and 17, respectively, while other features are described in the remaining claims.

Thanks to the use of an autoclave for joining under pressure the waterproofing sheath to the semimanufactured product, the process and the system according to the present invention can waterproof in a simple, fast and cheap manner the semimanufactured products, also when the latter have complex three-dimensional shapes.

Furthermore, the autoclave can be employed for simultaneously waterproofing several semimanufactured products, so as to make the process and the system according to the present invention even faster and cheaper.

For improving the joining between the waterproofing sheath and the semimanufactured product, the latter is preferably turned inside out between the beginning and the end of the process according to the present invention. Alternatively or additionally, the shaped support provided with the semimanufactured product and the sheath is inserted into a deformable wrapping before inserting the whole into the autoclave.

According to a particular aspect of the invention, it has been found that particular three-dimensional, breathable, elastomeric gloves made of a single piece, as described in WO 2004/060179, can be advantageously employed as waterproofing sheaths in the process according to the present invention for waterproofing gloves made of leather and/or fabric.

A further advantage of the process and the system according to the present invention lies not only in their greater productivity with respect to the known processes, but also in their relatively low production costs, so that they can be employed not only in the industrial production, but also in the handicraft production, in particular of footwear and gloves.

Further advantages and features of the process and the system according to the present invention will become clear to those skilled in the art from the following detailed and non-limiting description of two embodiments thereof with reference to the attached drawings, wherein:

FIGS. 1 to 7 shows the first embodiment of the system during different steps of the process; and FIGS. 8 and 9 show the second embodiment of the system during two alternative steps of the process.

Referring to FIG. 1, it is seen that the system according to the present invention comprises in a known way a shaped support 1 having a shape suitable for supporting a semimanufactured product to be waterproofed which has a three-dimensional conformation with at least one inner surface and one outer surface. In the present embodiment, the shaped support 1 has substantially the shape of a hand, since it serves for waterproofing a glove. In other embodiments of the invention the shaped support 1 may have a shape similar to a foot for waterproofing shoes or parts thereof, such as the shoe uppers, or similar to other parts of the human body for waterproofing clothing items and accessories. The shaped support 1 is preferably divided into at least two shaped members 1a and 1b which have a complementary shape, in particular similar to a portion of a hand which includes at least one finger. The first shaped member 1a includes wrist, palm and some fingers, in particular middle, ring and little fingers, while the second shaped member 1b includes the remaining fingers of the hand, i.e. forefinger and thumb, and can be coupled in the direction of the arrow to the first shaped member 1a, for example by means of a dovetail joint 2.

Figure 2:
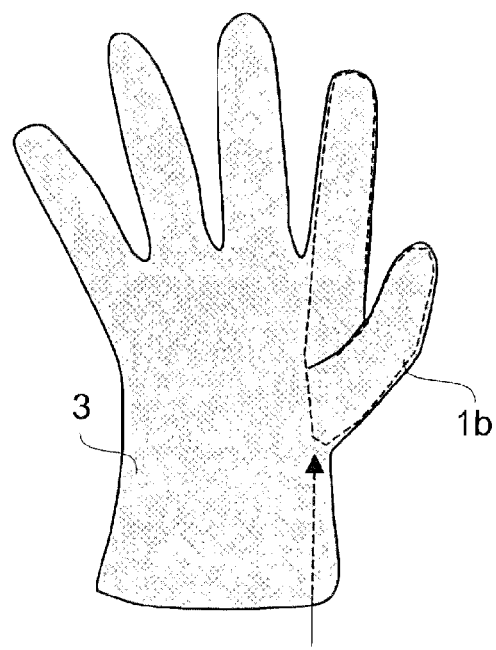

FIG. 2 shows the second shaped member 1b which is inserted in the direction of the arrow into a semimanufactured product 3 of footwear, clothing items and accessories, in particular a glove, which is provided with an inner surface and an outer surface. Before the second shaped member 1b is inserted, the semimanufactured product 3 is turned inside out, so that its inner surface is turned outwards.

FIG. 3 shows the first shaped member 1a which is inserted in the direction of the arrow into the semimanufactured product 3, turned inside out and already provided with the second shaped member 1b, so that the two shaped members 1a and 1b can be mutually coupled for making up the shaped support 1. A glue is applied onto the inner surface, turned outwards, of the semimanufactured product 3, for example through spraying means. Said glue is applied in a discontinuous manner onto the semimanufactured product 3 and/or it is permeable at least to water vapor, so as to not prevent the breathability through the semimanufactured product 3, which is generally made of a breathable material, for example leather and/or fabric.

FIGS. 4 and 5 show the semimanufactured product 3, turned inside out and provided with the shaped members 1a and 1b, which is in turn inserted into a waterproofing sheath 4 shaped for entirely or partially cover the inner surface, turned outwards, of the same semimanufactured product. In an alternative or additional embodiment, the surface of sheath 4 turned toward the semimanufactured product 3 is provided with a glue pattern, preferably thermoactivable, in particular made up of a plurality of polyurethane glue dots having a diameter comprised between 0.1 mm and 2 mm and a density comprised between 10 dots/cm$^2$ and 200 dots/cm$^2$. Sheath 4 preferably comprises at least one membrane made of a semi-permeable material, i.e. permeable to water vapor and impermeable to water, in particular polyurethane, which has a thickness preferably comprised between 5 μm and 100 μm, is preferably non-porous and elastic with a coefficient of elongation higher than 50%, in particular 100%. The surface of sheath 4 which is not turned toward the semimanufactured product 3 can be fastened to a support sheet which can be detached and is made of paper or a similar material, or is fixed and is made of fabric or a similar material, preferably elastic. Further information about the semipermeable membrane which can be used for sheath 4 is contained in WO 00/22948 and WO 02/11571. Sheath 4 can comprise one or more sheets of this semipermeable membrane, which are shaped and mutually joined along the edges. In another embodiment of the invention, sheath 4 is a particular three-dimensional breathable and elastomeric glove, which is made of a single piece, as disclosed in WO 2004/060179.

Figures 6, 7:
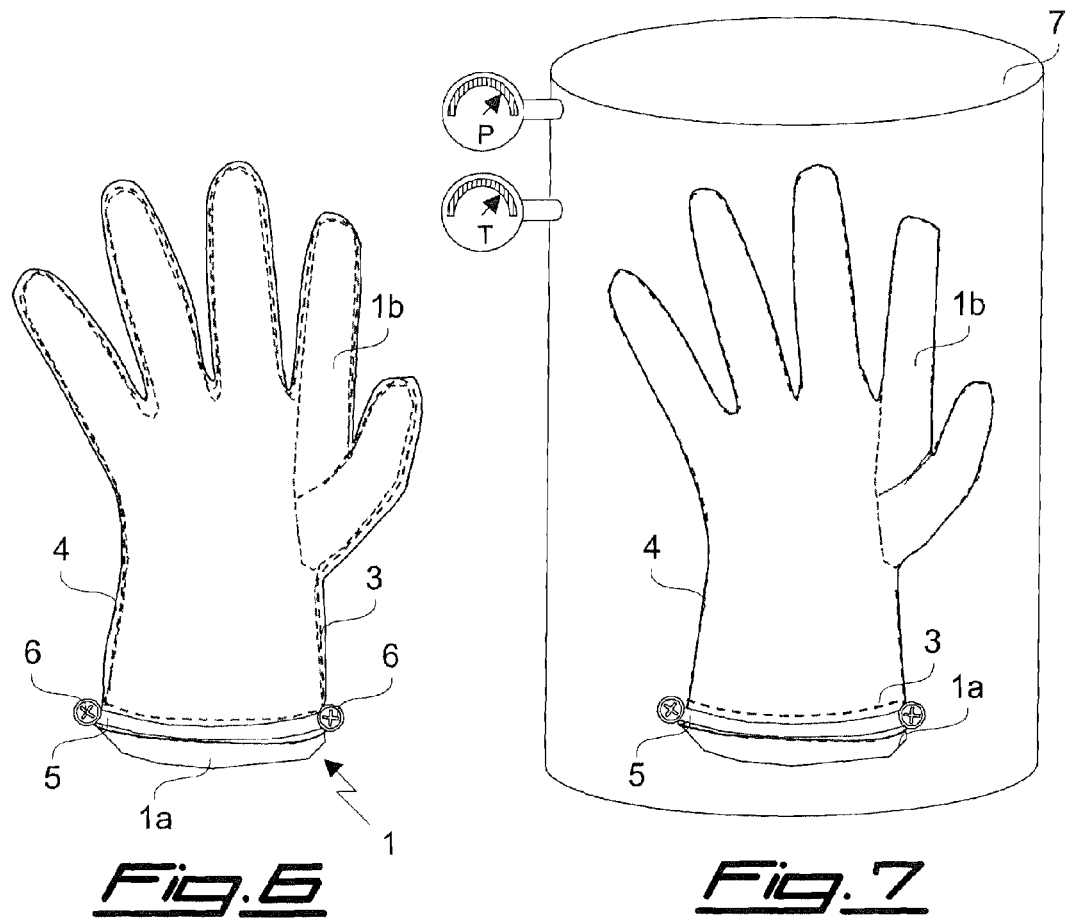

FIG. 6 shows a collar 5 which, thanks to one or more screws 6, is applied and tightened around the waterproofing sheath 4, in particular around the wrist zone of the first shaped member 1a, in order to seal sheath 4 for preventing the transfer of fluids from the outside between the sheath and the shaped support 1.

As shown in FIG. 7, the shaped support 1 provided with the semimanufactured product 3 and with the sealed sheath 4 is then inserted into an autoclave 7 for exerting a determined pressure onto sheath 4, so as to press and glue sheath 4 onto the semimanufactured product 3. During this operating step, the pressure in autoclave 7 is preferably greater than 1.5 bar. In the present embodiment autoclave 7 contains air, but in other embodiments it may contain other fluids, in particular water vapor or oil, according to the dimensions and/or the material of the semimanufactured product 3. If the glue applied between the semimanufactured product 3 and sheath 4 is thermoactivable, the temperature inside autoclave 7 is greater than 100° C., so as to activate this glue. In an alternative or additional embodiment, heating means, such as for example an electric resistor, can be arranged in the shaped support 1 for heating the glue. Once the time sufficient for joining sheath 4 to the semimanufactured product 3 has lapsed, the latter is extracted from autoclave 7, is separated from collar 5 and from the shaped support 1, and finally is turned inside out, so that its outer surface is turned outwards and its inner surface, joined with sheath 4, is turned inwards. Several semimanufactured products provided with their sheath can be simultaneously inserted into autoclave 7 for their waterproofing.

FIG. 8 shows a second embodiment of the process, similar to the first embodiment, wherein the shaped support 1 provided with the semimanufactured product 3, which is arranged not inside out on sheath 4, also arranged not inside out on the shaped support 1, is inserted into a deformable wrapping 8, for example a bag, through at least one opening which is sealed by means of a unidirectional valve 9 before inserting the whole into autoclave 7.

As shown in FIG. 9, the pressure exerted by the fluid contained in autoclave 7 presses wrapping 8 onto the surface of the semimanufactured product 3, which is in turn pressed onto sheath 4, thereby discharging the air contained in wrapping 8 through valve 10. For improving the adherence, the deformable wrapping 8 has a shape corresponding to the three-dimensional shape of the semimanufactured product 3, for example the shape of a glove, and can also be evacuated before the pressing step. Since collar 5 is not necessary, this second embodiment is useful for waterproofing footwear uppers, clothing items and other semimanufactured products which are not provided with a single opening as the gloves.

Further changes and/or additions may be made by those skilled in the art to the hereinabove described and illustrated embodiments, while remaining within the scope of the same invention.

The invention claimed is:

1. A method for waterproofing a semimanufactured product of footwear, gloves, clothing items, or accessories, said semimanufactured product having a three-dimensional conformation with at least one inner surface and one outer surface, the method comprising:
    arranging on a shaped support the semimanufactured product with at least one waterproofing sheath shaped to entirely or partially cover one or more surfaces of the semimanufactured product to be waterproofed, wherein glue is applied between the surfaces to be waterproofed and the waterproofing sheath, wherein the waterproofing sheath is a three-dimensional membrane that is breathable, elastomeric and is made of a single piece;
    sealing an opening between the semimanufactured product and the waterproofing sheath to prevent entry of fluid between the sheath and the shaped support through the opening; and
    inserting the shaped support provided with the semimanufactured product and with the sheath into an autoclave for joining, under pressure and/or heat, the sheath to the semimanufactured product;
    wherein the sealing is performed prior to the sheath being joined to the semimanufactured product in the autoclave.

2. The method of claim 1, wherein the semimanufactured product is turned inside out before it is arranged on the shaped support so that its outer surface is turned toward the shaped support and its inner surface is turned toward the waterproofing sheath.

3. The method of claim 1, wherein the glue is applied onto the inner surface, turned inside out, of the semimanufactured product arranged on the shaped support.

4. The method of claim 1, wherein the glue is thermoactivable and is heated in the autoclave during pressing to join the waterproofing sheath to the semimanufactured product.

5. The method of claim 1, wherein the temperature in the autoclave during the pressing is greater than 100° C.

6. The method of claim 1, wherein the pressure in the autoclave is greater than 1.5 bar.

7. The method of claim 1, wherein the surface of the waterproofing sheath turned toward the semimanufactured product is provided with a glue pattern.

8. The method of claim 1, wherein the waterproofing sheath comprises at least one membrane made of a semipermeable material.

9. The method of claim 1, wherein the waterproofing sheath comprises at least one membrane made of polyurethane.

10. The method of claim 1, wherein the semipermeable membrane is non-porous and carries out transfer of water vapor by osmosis.

11. The method of claim 1, wherein the opening between the semimanufactured product and the waterproofing sheath is sealed by means of a collar that is applied and tightened around the waterproofing sheath and the shaped support.

12. A method for waterproofing a semimanufactured product of footwear, gloves, clothing items, or accessories, said semimanufactured product having a three-dimensional conformation with at least one inner surface and one outer surface, the method comprising:

arranging on a shaped support the semimanufactured product with at least one waterproofing sheath shaped to entirely or partially cover one or more surfaces of the semimanufactured product to be waterproofed;

placing the semimanufactured product coupled to the waterproofing sheath into a deformable wrapping that surrounds the semimanufactured product and the waterproofing sheath, wherein the deformable wrapping has a single opening;

sealing the single opening of the deformable wrapping to prevent entry of fluid into an interior of the deformable wrapping through the opening; and inserting the shaped support provided with the semimanufactured product, the sheath, and the sealed deformable wrapping into an autoclave for joining, under pressure and/or heat, the sheath to the semimanufactured product.

13. The method of claim 12, wherein the deformable wrapping has a shape corresponding to a three-dimensional shape of the semimanufactured product.

14. The method of claim 12, wherein the deformable wrapping is evacuated before pressing in the autoclave.

15. The method of claim 1, wherein the sealing is performed by a sealing component that is removed after the joining of the sheath to the semimanufactured product in the autoclave.

16. The method of claim 1, wherein the sealing is performed by a sealing component that is applied to a surface of the sheath that is turned away from the semimanufactured product and/or to a surface of the semimanufactured product that is turned away from the sheath.

* * * * *